(No Model.)
V. G. SMITH.
MOWING MACHINE.
No. 365,946. Patented July 5, 1887.
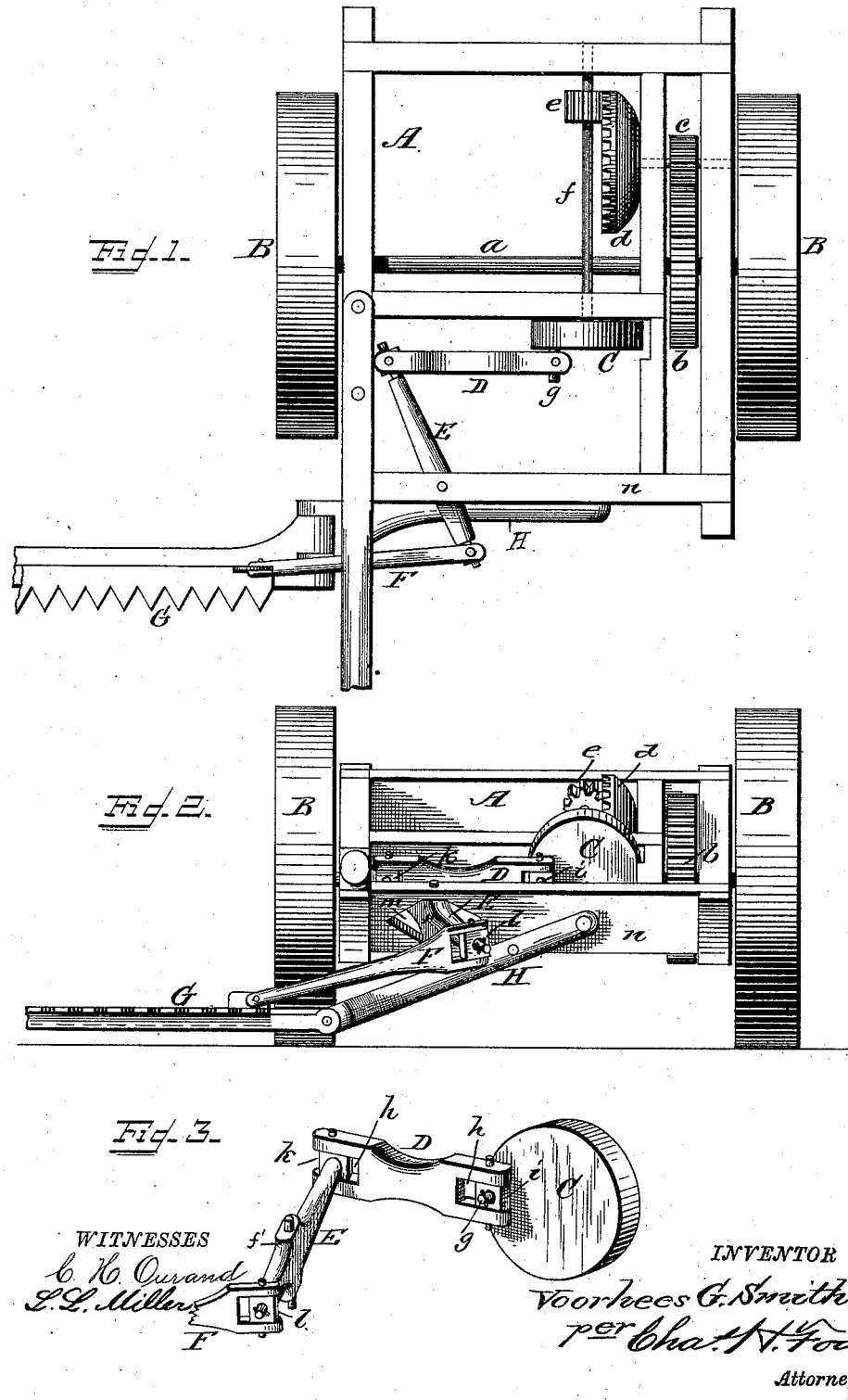
WITNESSES
C. H. Durand
L. L. Miller
INVENTOR
Voorhees G. Smith.
per Chas. H. Fowler
Attorney

UNITED STATES PATENT OFFICE.

VOORHEES G. SMITH, OF IOLA, KANSAS.

MOWING-MACHINE.

SPECIFICATION forming part of Letters Patent No. 365,946, dated July 5, 1887.

Application filed August 14, 1886. Serial No. 210,906. (No model.)

*To all whom it may concern:*

Be it known that I, VOORHEES G. SMITH, a citizen of the United States, residing at Iola, in the county of Allen and State of Kansas, have invented certain new and useful Improvements in Mowing-Machines; and I do hereby declare that the following is a full, clear, and exact description of the same, reference being had to the annexed drawings, making a part of this specification, and to the letters and figures of reference marked thereon.

Figure 1 of the drawings is a top plan view of my invention; Fig. 2, an end view thereof, and Fig. 3 a detail view in perspective of the pitman and its connections.

The object of the present invention is to provide a mowing-machine that will be light, durable, and easily operated, and with few part, whereby it is less liable to get out of order, which objects I attain by the constructions substantially as shown in the drawings and hereinafter described and claimed.

In the accompanying drawings, A represents the frame of the machine of any suitable form and construction, which is supported by the axle $a$, upon which are mounted the wheels B. The axle $a$ has connected to it a gear-wheel, $b$, which meshes with the teeth of a pinion, $c$, the pinion being rigidly connected to a shaft, which has its bearings in the frame of the machine, and to one end of this shaft is keyed a suitable gear-wheel, $d$. This last-mentioned gear-wheel engages with a pinion, $e$, upon a longitudinal shaft, $f$, which also has its bearings in the frame of the machine, and to the front end thereof is keyed a disk, C, and to this disk, by a crank-pin, $g$, is connected the arm D. This arm, at its ends, has open slots $h$, in which are located the journal-blocks $i\ k$, said journal-blocks being pivotally held within the slots, and form bearings, respectively, for the crank-pin $g$ and a lever-connection, E, which is connected at one end to the pitman F, said pitman being connected in the usual manner to the cutter-bar G of the harvester by means of the pivoted journal-block $l$. The arm E passes through an opening, $m$, in the transverse beam $n$ at the front end of the frame A, and is pivoted to said beam, as shown, which forms a fulcrum for the arm when operated by the rotation of the disk C.

The finger-bar of the machine is supported by means of the arm H, which is pivoted to the end beam, $n$.

It will be seen that a swivel-connection is made between the pitman F, lever E, arm D, and disk C, forming double joints, so that they will work either way without binding on any part of the machine, making a very perfectly-operating mechanism for driving the cutter-knives of a harvester or mowing-machine.

I deem it important that the beam $n$ be slotted to receive the lever E, instead of slotting the axle for this purpose, as has heretofore been proposed; also, that the crank-disk and all the connections between said disk and the cutter-bar be forward of the axle and independent thereof, thus not only distributing the weight of the operating mechanism, but also allowing of the ready removal of any of the parts thereof, or of the axle, for repairs or other purposes. The slot $m$ in the beam is diamond-shaped, to accommodate the enlarged portion $f'$ of the lever E, which enlarged portion receives the pivots of said lever and strengthens the lever and guards against breakage in use.

Having now fully described my invention, what I claim as new, and desire to secure by Letters Patent, is—

The combination, with the frame, axle, wheels, finger-bar, and cutter-bar, of the beam $n$, formed with diamond-shaped slot $m$ and connecting the longitudinal bars of the frame forward of the axle, the shaft $f$, at right angles to the axle and geared therewith, the crank-disk C on the shaft $f$, forward of the axle, lever E, formed at its center with enlarged portion $f'$, the pivots in said enlarged portion having bearings $d$ in the slotted portion of the beam, the link D, pivotally connecting one end of the lever with the crank-pin $g$ of the crank-disk C, the link F, pivotally connecting the other end of the lever with the cutter-bar, and the coupling-bar H, pivoted at one end to the beam $n$ and at the other to the finger-bar, substantially as shown and described, and for the purpose specified.

In testimony that I claim the above I have hereunto subscribed my name in presence of two witnesses.

V. G. SMITH.

Witnesses:
 J. C. SMITH,
 W. W. SPRAGUE.